(12) United States Patent
Herman et al.

(10) Patent No.: US 7,556,880 B2
(45) Date of Patent: Jul. 7, 2009

(54) COMPOSITIONAL AND STRUCTURAL GRADIENTS FOR FUEL CELL ELECTRODE MATERIALS

(75) Inventors: Gregory S Herman, Albany, OR (US);
David Champion, Lebanon, OR (US);
Peter Mardilovich, Corvallis, OR (US);
James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/900,788

(22) Filed: Sep. 12, 2007

(65) Prior Publication Data

US 2008/0008912 A1      Jan. 10, 2008

Related U.S. Application Data

(62) Division of application No. 10/345,849, filed on Jan. 16, 2003, now Pat. No. 7,291,417.

(51) Int. Cl.
*H01M 4/86* (2006.01)
*H01M 8/02* (2006.01)
*H01M 4/88* (2006.01)

(52) U.S. Cl. .............. 429/40; 429/38; 429/13; 429/12; 429/34; 502/101

(58) Field of Classification Search .............. None
See application file for complete search history.

(56) References Cited

U.S. PATENT DOCUMENTS 5,114,803 A * 5/1992 Ishihara et al. ............. 429/30
6,228,521 B1 * 5/2001 Kim et al. ................... 429/33

FOREIGN PATENT DOCUMENTS

EP          1176654 A2 *  1/2002
JP         03-222261    * 10/1991

* cited by examiner

*Primary Examiner*—Patrick Ryan
*Assistant Examiner*—Angela Martin (57) ABSTRACT

A fuel cell includes at least one electrode operatively disposed in the fuel cell, and having a catalytically active surface. The present invention further includes a mechanism for maintaining a substantially uniform maximum catalytic activity over the surface of the electrode.

9 Claims, 5 Drawing Sheets

COMPOSITIONAL AND STRUCTURAL GRADIENTS FOR FUEL CELL ELECTRODE MATERIALS

CROSS-REFERENCE TO RELATED APPLICATION

The present application is a divisional application of Ser. No. 10/345,849, filed Jan. 16, 2003 now U.S. Pat. No. 7,291,417.

BACKGROUND OF THE INVENTION

The present invention relates generally to fuel cells, and more particularly to fuel cells having electrodes with compositional and/or structural gradients.

Fuel cells use an electrochemical energy conversion of a fuel and oxidant into electricity and heat. It is anticipated that fuel cells may be able to replace primary and secondary batteries as a portable power supply. In fuel cells, the fuel (containing a source of hydrogen or other oxidizable compound) is oxidized with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

As such, fuel cells provide a direct current (DC) voltage that may be used to power motors, lights, electrical appliances, etc. A solid oxide fuel cell (SOFC) is one type of fuel cell that may be useful in portable applications, as well as in many other applications.

A significant amount of effort has been expended in optimizing composition and porosity of electrodes. Typical approaches have involved electrodes formed from materials having a constant compositional and structural morphology. More recently, a structural and/or compositional gradient of the electrode in the direction away from the electrolyte appears to provide some benefit in improving performance of SOFC systems. Unfortunately, in both cases, compromises are necessarily made relating to operating temperatures, fuel cell performance, and fuel utilization when using materials with such morphologies.

SUMMARY OF THE INVENTION

The present invention solves the drawbacks enumerated above by providing a fuel cell including at least one electrode operatively disposed in the fuel cell, and having a catalytically active surface. The present invention further includes a mechanism for maintaining a substantially uniform maximum catalytic activity over the surface of the electrode.

BRIEF DESCRIPTION OF THE DRAWINGS

Objects, features and advantages of embodiments of the present invention may become apparent upon reference to the following detailed description and drawings, in which.

DETAILED DESCRIPTION OF THE EMBODIMENTS

The present invention is predicated upon the unexpected and fortuitous discovery that performance of a fuel cell may be improved by varying the composition and/or structure of fuel cell electrodes (anodes/cathodes) with respect to the distance from the gas inlet to maximize the catalytic activity to specific reactions related to the composition of the gas along the flow path, and/or by varying the composition of the gas (fuel and/or oxidant) over the catalytically active surface of an electrode (with or without compositional and/or structural gradients).

It is to be understood that, throughout this disclosure, the definition of "structure" and/or "structural" is intended to include morphology, porosity, crystalline structure, and the like.

For anodes, the fuel near the inlet is predominantly a hydrocarbon, but along the flow path, reforming or partial oxidation processes can produce carbon monoxide and hydrogen, which may be among the dominant gases further downstream, especially under conditions of high fuel utilization. Although catalysts that can reform, oxidize, or partially oxide a hydrocarbon fuel can typically oxidize carbon monoxide, hydrogen, and/or other partial oxidation products, they are not optimized for these gases. In contrast, embodiments of the present invention choose compositional and/or structural gradients of the anode material so as to increase catalytic activity of the anode depending upon where in the flow path the anode or discrete area of the anode is positioned.

With regard to cathodes, the air near the inlet has not yet been depleted of oxidants (e.g. is rich with oxygen), whereas further downstream, the air becomes partially depleted or substantially depleted of oxidants. Embodiments of the present invention choose compositional and/or structural gradients of the cathode material so as to increase catalytic activity of the cathode depending upon where in the flow path the cathode or discrete area of the cathode is positioned.

Figure 1:
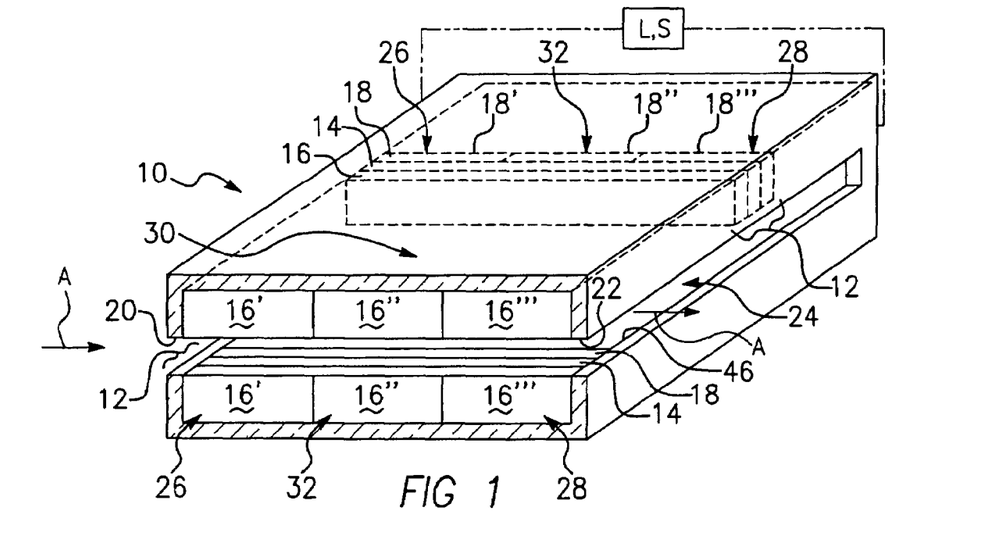
FIG. 1 is a semi-schematic cross-sectional perspective view of an embodiment of the present invention, showing fuel cell assemblies and the gas flow passage in an embodiment of a single chamber fuel cell.

Referring now to FIG. 1, an embodiment of the fuel cell of the present invention is designated generally as 10. Fuel cell 10 includes a flow passage 24 having a gas stream flowing therethrough in the direction of arrow A. Fuel cell 10 further includes at least one electrode 16, 18 operatively disposed in the flow passage 24. The electrode may be an anode 16 and/or a cathode 18. The electrode(s) are part of a fuel cell assembly 12, which includes an electrolyte 14, an anode 16 disposed on one side of the electrolyte 14, and a cathode 18 disposed on the same or the other side of the electrolyte 14. It is generally desirable for fuel cell 10 to include a plurality of fuel cell assemblies 12.

It is to be understood that the fuel cell 10 may be one of solid oxide fuel cells, proton conducting ceramic fuel cells, alkaline fuel cells, Polymer Electrolyte Membrane (PEM) fuel cells, molten carbonate fuel cells, solid acid fuel cells, and Direct Methanol PEM fuel cells. In an embodiment of the present invention, fuel cell 10 is a solid oxide fuel cell.

In the embodiment of FIG. 1, the fuel cell 10 is an example of a single chamber fuel cell. In single chamber fuel cells, it may be desirable to space apart adjacent fuel cell assemblies 12 so as to promote gas transport to more of the catalytically active surfaces of the anode 16 and cathode 18. The stacking order of these cells may be anode 16/gas channel 46/anode 16; or anode 16/gas channel 46/cathode 18. Alternatively and optionally, the cell 10 could be stacked anode 16/electrolyte 14/cathode 18/electrolyte 14/anode 16/electrolyte 14, etc. without gas channels 46 between adjacent fuel cell assemblies 12.

The electrode 16, 18 has at least one discrete, catalytically active area, the composition and/or the structure of which is predetermined based upon an expected composition of the gas stream to which the discrete area is exposed. If the electrode is anode 16, the discrete catalytically active areas are designated as 16', 16" and 16'". Although three discrete areas 16', 16" and 16'" are shown, it is to be understood that anode 16 may include any number of discrete catalytically active areas as desired, or may continuously vary along the indicated direction. If the electrode is cathode 18, the discrete catalytically active areas are designated as 18', 18" and 18'". As with anode 16, it is to be understood that although three discrete areas 18', 18" and 18'" are shown, cathode 18 may include any number of discrete catalytically active areas as desired, or may continuously vary along the indicated direction.

Fuel cell 10 further includes an inlet 20 adjacent an entrance to flow passage 24, wherein the electrode 16, 18 has an inlet end region 26 proximate the inlet 20, and wherein the discrete area 16', 18' is located at the inlet end region 26. It is to be understood that inlet 20 may be an inlet for fuel, oxidants, or both fuel and oxidants. If the electrode is an anode 16, the expected composition of the gas stream at the inlet end region 26 is generally substantially unreformed hydrocarbon fuel. As such, according to an embodiment of the present invention, the composition and/or the structure of discrete area 16' is optimized for substantially unreformed hydrocarbon fuel.

If the electrode is a cathode 18, the expected composition of the gas stream at inlet end region 26 is a gas stream substantially undepleted of oxidants. As such, according to an embodiment of the present invention, the composition and/or the structure of discrete area 18' is optimized for a gas stream substantially undepleted of oxidants.

Fuel cell 10 further includes an outlet 22 adjacent an exit from flow passage 24. The electrodes 16, 18 have an outlet end region 28 proximate the outlet 22. Discrete areas 16'", 18'" are located at the outlet end region 28.

If the electrode is an anode 16, the expected composition of the gas stream at outlet end region 28 is at least one of substantially reformed or partially reformed hydrocarbon fuel, byproducts thereof, and mixtures thereof. As such, according to an embodiment of the present invention, the composition and/or the structure of discrete area 16'" is optimized for at least one of substantially reformed or partially reformed hydrocarbon fuel, byproducts thereof, and mixtures thereof.

If the electrode is a cathode 18, the expected composition of the gas stream at outlet end region 28 is a gas stream substantially depleted of oxidants. As such, according to an embodiment of the present invention, the composition and/or structure of discrete area 18'" is optimized for a gas stream substantially depleted of oxidants.

Flow passage 24 has a midpoint 30, and the electrode 16, 18 has a midpoint region 32 proximate midpoint 30. Discrete area 16", 18" is located at the midpoint region 32.

If the electrode is an anode 16, the expected composition of the gas stream at midpoint region 32 is at least one of substantially unreformed or partially reformed hydrocarbon fuel, byproducts thereof, and mixtures thereof. As such, according to an embodiment of the present invention, the composition and/or structure of discrete area 16" is optimized for at least one of substantially unreformed or partially reformed hydrocarbon fuel, byproducts thereof, and mixtures thereof.

If the electrode is a cathode 18, the expected composition of the gas stream at midpoint region 32 is a gas stream partially depleted of oxidants. As such, according to an embodiment of the present invention, the composition and/or structure of discrete area 18" is optimized for a gas stream partially depleted of oxidants.

An electronic device according to the present invention includes an electrical load L, and fuel cell 10 connected to the load L. An embodiment of a method of using fuel cell 10 includes the step of operatively connecting the fuel cell 10 to electrical load L and/or to an electrical storage device S. The electrical load L may include many devices, including, but not limited to any or all of computers, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell 10 of the present invention may, in some instances, be suitable for use in the transportation industry, e.g. to power automobiles, and in the utilities industry, e.g. within power plants.

Figure 1A:
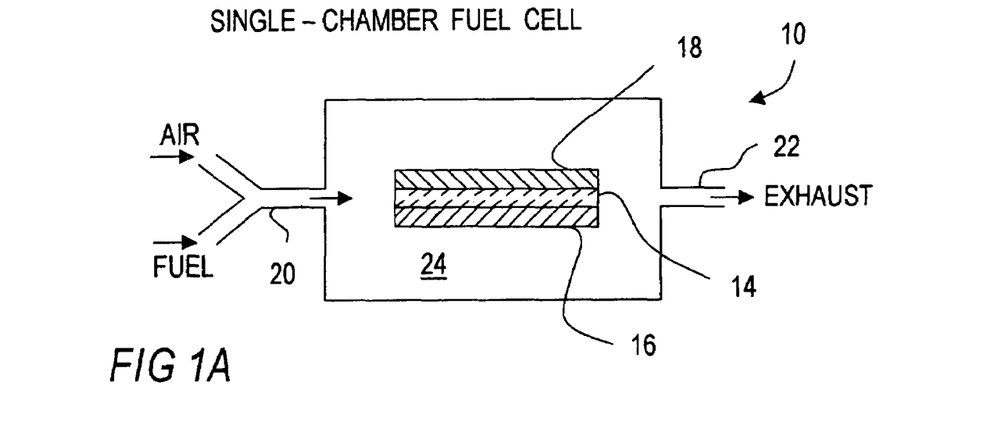
FIG. 1A is a schematic view an alternate embodiment of a single chamber fuel cell.
Figure 1B:
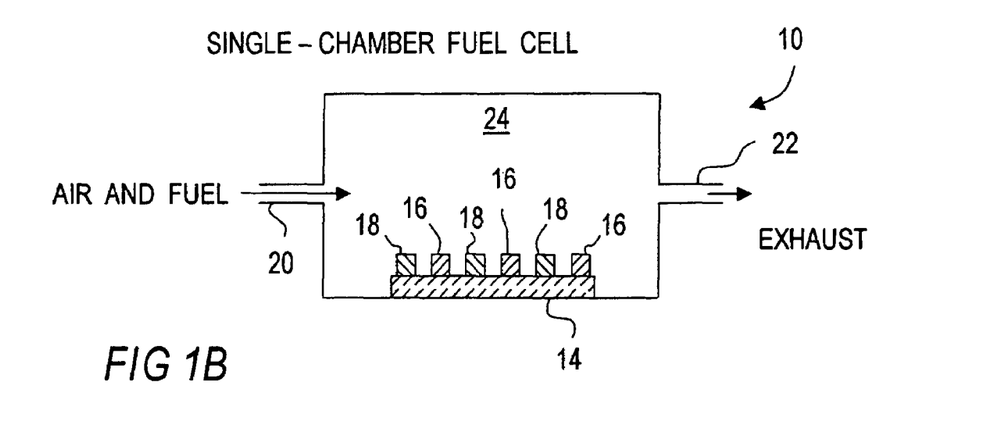
FIG. 1B is a schematic view of another alternate embodiment of a single chamber fuel cell.

Alternate embodiments of single chamber fuel cells are shown in FIGS. 1A and 1B.

Figure 1C:
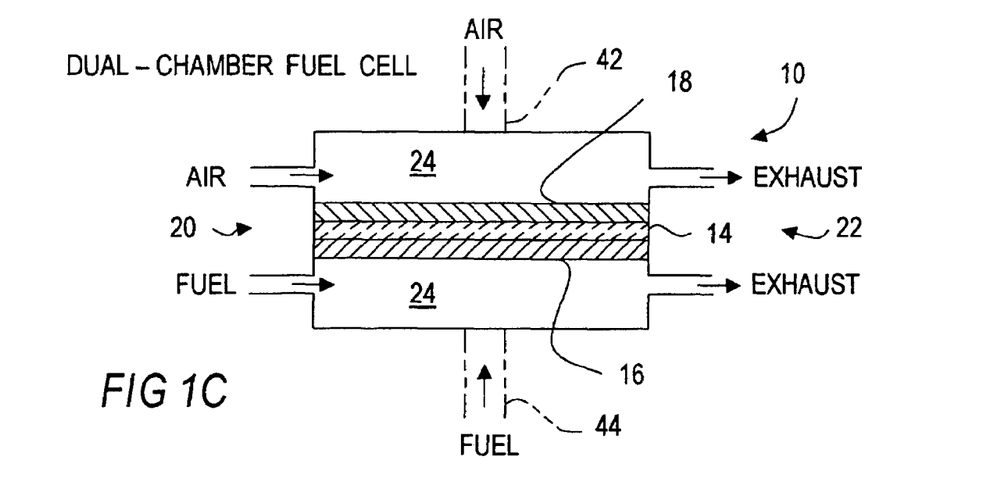
FIG. 1C is a schematic view of an embodiment of a dual chamber fuel cell, showing in phantom optional inlet(s) downstream for fuel and/or air.

Referring now to FIG. 1C, an embodiment of a dual chamber fuel cell is shown, whereby air (as a source of oxidant) is fed to the cathode 18 side, and fuel (as a source of reactant) is fed to the anode 16 side. An optional additional air inlet 42 is shown in phantom downstream from inlet 20; and an optional additional fuel inlet 44 is shown in phantom downstream from inlet 20. It is to be understood that, although only one additional air/fuel inlet 42, 44 is shown, there may be any number of inlets 42, 44 as desired. Further, there may be additional air inlet(s) 42 with or without additional fuel inlet(s) 44, and vice versa. It is to be further understood that a manifold and/or similar apparatus, operatively and fluidly connected to the anode 16 side of flow passage 24 and/or to the cathode 18 side of flow passage 24, may be provided for adding oxidants and/or fuel in at least one area downstream from inlet 20. This may aid in ensuring efficient reactions downstream from the inlet 20, given the composition of the air/fuel and the particular electrode material at a given location. By adding extra air (i.e. oxygen) at different locations on the cathode 18 side, downstream from the inlet 20, partial and total oxidation of the fuel can be controlled. This may reduce the temperature gradient, increase the fuel utilization and improve the performance of the fuel cell 10. Coking may be controlled by reducing the concentration of the fuel at specific locations on the anode 16, and furthermore, may reduce the temperature gradient on the anode 16. Coking may be defined as the conversion of small chain hydrocarbons to an inactive layer of carbon compounds that modify the catalyst in such a way as to reduce performance.

Figure 2:
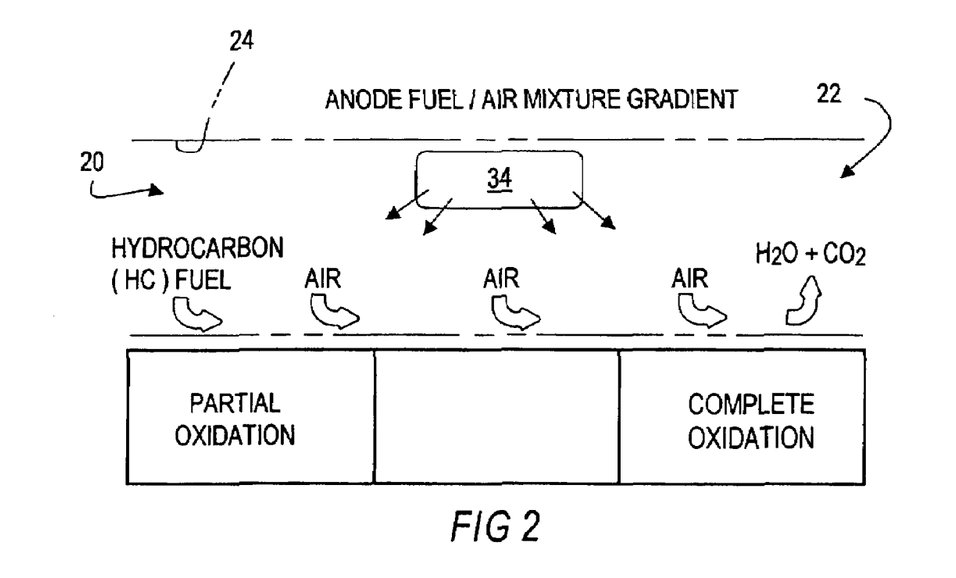
FIG. 2 is a block diagram of an embodiment of an anode fuel/air mixture gradient for a single chamber fuel cell, schematically showing a manifold and the flow passage in phantom.

Referring now to FIG. 2, fuel cell 10 is a single chamber fuel cell (FIGS. 3-9 may relate to either single or dual chamber fuel cells) and may further optionally include additional inlets and/or a manifold 34 (shown schematically in FIG. 2) and/or similar apparatus, operatively and fluidly connected to flow passage 24, for adding oxidants, fuel and/or a fuel/air mixture in at least one area downstream from inlet 20. This may aid in ensuring efficient reactions downstream from the inlet 20, given the composition of the fuel and the particular electrode material at a given location. By adding extra air (i.e. oxygen) at different locations downstream from the inlet 20, partial and total oxidation of the fuel can be controlled. This may reduce the temperature gradient, increase the fuel utilization and improve the performance of the fuel cell 10. By adding extra fuel and/or an air/fuel mixture at different locations downstream from the inlet 20, the dilution effect (due to hydrocarbon fuels' production of reaction product(s)) may be controlled.

Along the fuel path, the fuel may react to form water, carbon dioxide, carbon monoxide and $H_2$. Exhaust will result in a dilution effect, and air adds $N_2$ as well. Conventional fuel cells have a single ratio of fuel to air along the reaction path, whereas in embodiments of the present invention, the ratio of fuel to air is varied along the reaction path. In addition, a single chamber design of a fuel cell 10 according to an embodiment of the present invention may have a compositional gradient of both the anode 16/cathode 18 material, and the gas phase reactants (adding air downstream to control the composition of the gas).

Figure 3:
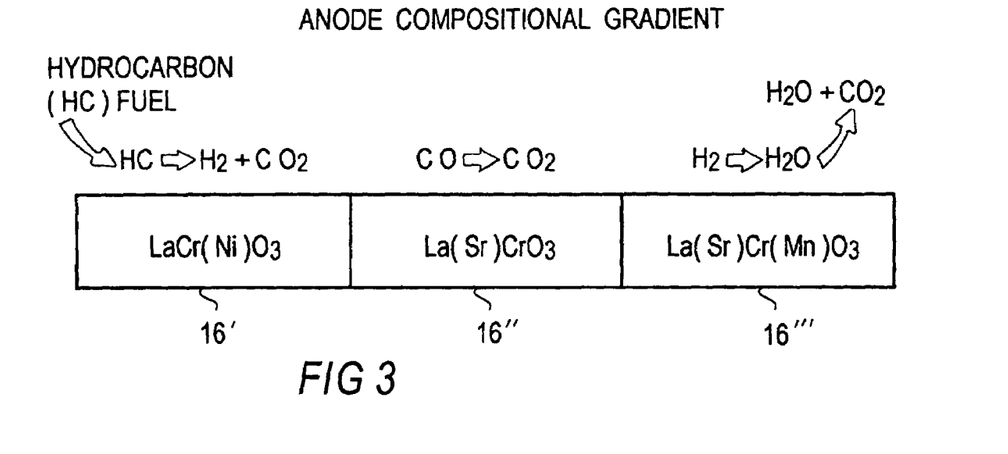
FIG. 3 is a block diagram showing an embodiment of an anode compositional gradient.

Referring now to FIG. 3, in a non-limitative embodiment of the anode 16 of the present invention, discrete area 16' has as a main component thereof $LaCr(Ni)O_3$, the composition of discrete area 16" has as a main component thereof $La(Sr)CrO_3$, and the composition of discrete area 16''' has as a main component thereof $La(Sr)Cr(Mn)O_3$. This is an example of a compositional gradient of the anode material 16 which allows for more complete utilization of the fuel. Higher performance may be obtained by controlling the catalyst and the resulting gas composition. The $LaCrO_3$ perovskite system of FIG. 3 is one non-limitative example of optimizing catalytic activity of an anode 16 according to embodiments of the present invention.

Doping the A and B sites of the perovskite lattice may significantly alter the observed catalytic activity and selectivity. The nomenclature is $A(C)B(D)O_3$, where A and B are the specific sites in the perovskite structure, and C and D are the dopants on the sites.

It has been observed that $LaCr(Ni)O_3$ is good for methane conversion and reforming reactions, $La(Sr)CrO3$ is good for carbon monoxide oxidation, and $La(Sr)Cr(Mn)O_3$ is good for hydrogen oxidation.

It is to be understood that material systems other than those described herein may be used as well, depending on the desired characteristics and the fuels to be used.

Figure 4:
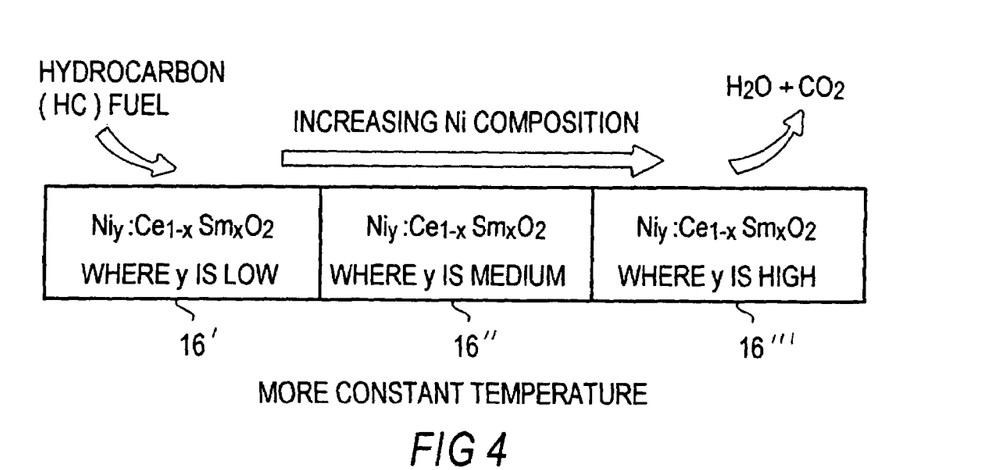
FIG. 4 is a block diagram showing a further embodiment of an anode compositional gradient.

Referring now to FIG. 4, in an alternate non-limitative embodiment of the anode 16 of the present invention, the composition of discrete area 16''' includes a first amount of nickel in an anode material (for example, a samaria doped ceria (SDC)), the composition of discrete area 16" includes a second amount of nickel, which is less than the first amount of nickel, and the composition of discrete area 16' includes a third amount of nickel, which is less than the second amount of nickel.

Nickel assists in reaction of hydrocarbons. However, nickel (and/or other metals which assist in reaction of hydrocarbons) may cause undesirable temperature gradients which may lead to cracking of the fuel cell 10. For example, with Ni-SDC, most of the reaction occurs proximate the fuel inlet, and this causes a temperature gradient (the fuel cell films/film stacks are hotter at the inlet 20 than at the outlet 22). An embodiment of the present invention as shown in FIG. 4 provides a more constant temperature across the anode 16/fuel cell 10 by lowering the amount of nickel at the fuel inlet 20. This compositional gradient of the anode material 16 allows for more even heating of the anode 16 during exothermic reactions so that the inlet end region 26 of the anode 16 does not become overheated. This may reduce stress related to different thermal expansion at different regions of the fuel cell 10.

With better control over the heat given off by the exothermic reactions, other components of the fuel cell 10 may advantageously be optimized for the lower temperature operation.

In addition or alternatively to selectively varying the ratio of nickel and/or other metals, it is contemplated as being within the purview of the present invention to vary the ceramic ratio, vary doping, etc.

Figure 5:
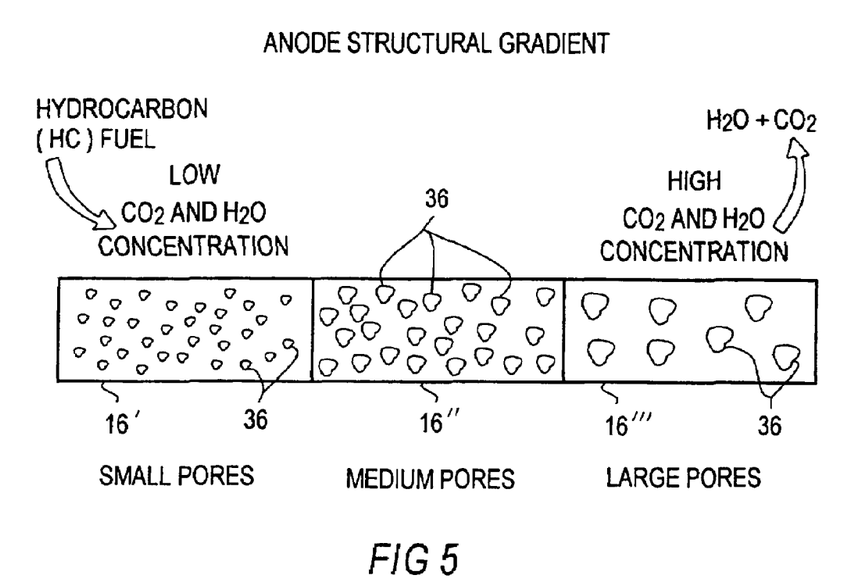
FIG. 5 is a block diagram showing an embodiment of an anode structural gradient.

Referring now to FIG. 5, a non-limitative embodiment of an anode 16 structural gradient is shown. The structure of discrete area 16''' includes pores 36, the structure of discrete area 16" includes pores 36 smaller than the pores 36 in discrete area 16''', and the structure of discrete area 16' includes pores 36 smaller than the pores 36 in discrete area 16". Structural gradients, in porosity, as well as three phase boundary length, may be controlled at different regions of the anode 16 of embodiments of the present invention. More porous anodes 16 may be used at regions with higher exhaust compositions to reduce diffusion limitations in the transport of reactive species to the electrocatalytically active areas; for example, larger pore sizes at the portion 16''' of the anode 16 reduce diffusional losses related to the transport of fuel (with a high concentration of $CO_2$ and $H_2O$ present) to the three phase boundary in the anode 16. It is to be understood that FIG. 5 is a very simplified representation. For example, the structural gradient may not simply be smaller to bigger pores 36, it may be anode 16 with different pore size distribution(s), e.g. dual distribution which may be a combination of large, transport pores for faster diffusion and nanopores with a higher concentration of catalytic centers.

Figure 6:
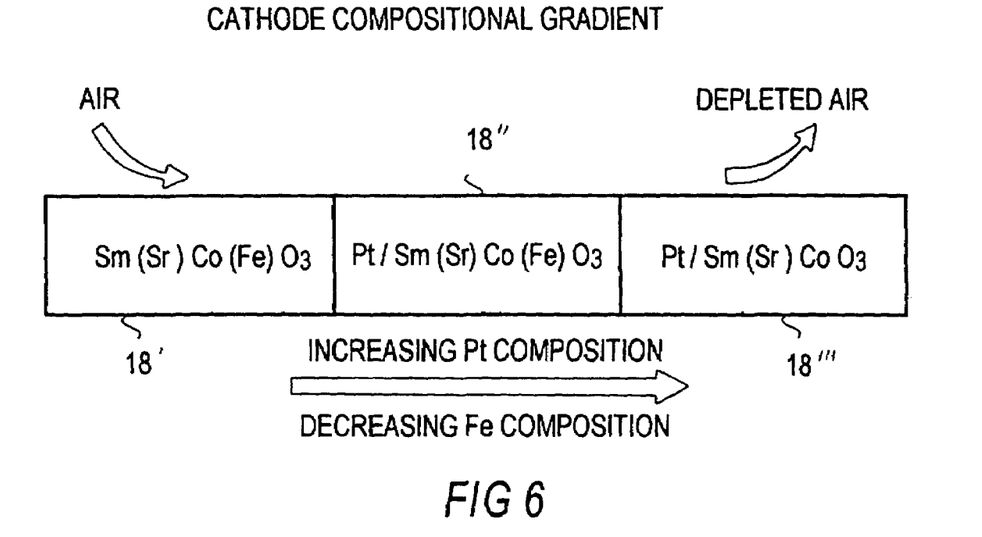
FIG. 6 is a block diagram of an embodiment of a cathode compositional gradient.

Referring now to FIG. 6, a non-limitative embodiment of a cathode 18 compositional gradient is shown. It is to be understood that the main/base material for cathode 18 may be any suitable material, for example, it may be chosen from examples of cathode materials listed below. In an embodiment, an example of a suitable main material for cathode 18 is $Sm(Sr)CoO_3$ (SSCO).

The composition of discrete area 18''' includes a first amount of material catalytically more active (than the main/base cathode 18 material) for the electrochemical reduction of molecular oxygen. The more catalytically active material may aid the reduction of oxygen in depleted atmospheres. It is to be understood that this more catalytically active material may be any suitable material. In an embodiment, this more catalytically active material is at least one of platinum, ruthenium, rhodium, silver, mixtures thereof, and the like.

The composition of discrete area 18" includes a second amount of the more catalytically active material which is less than the first amount of the more catalytically active material, and further includes a first amount of material catalytically less active than the main/base cathode 18 material. It is to be understood that this catalytically less active material may be any suitable material. In an embodiment, this catalytically less active material is at least one of iron, manganese, mixtures thereof, and the like.

The composition of discrete area 18' includes a second amount of the catalytically less active material, which is more than the first amount of catalytically less active material. Without being bound to any theory, it is believed that the addition of the less catalytically active material will typically result in less active materials than the pure main material (e.g. SSCO), but may better match the thermal expansion properties of the other components in the fuel cell 10. Since the inlet usually runs hotter, this may help reduce delamination or other stress in the cell.

Figure 7:
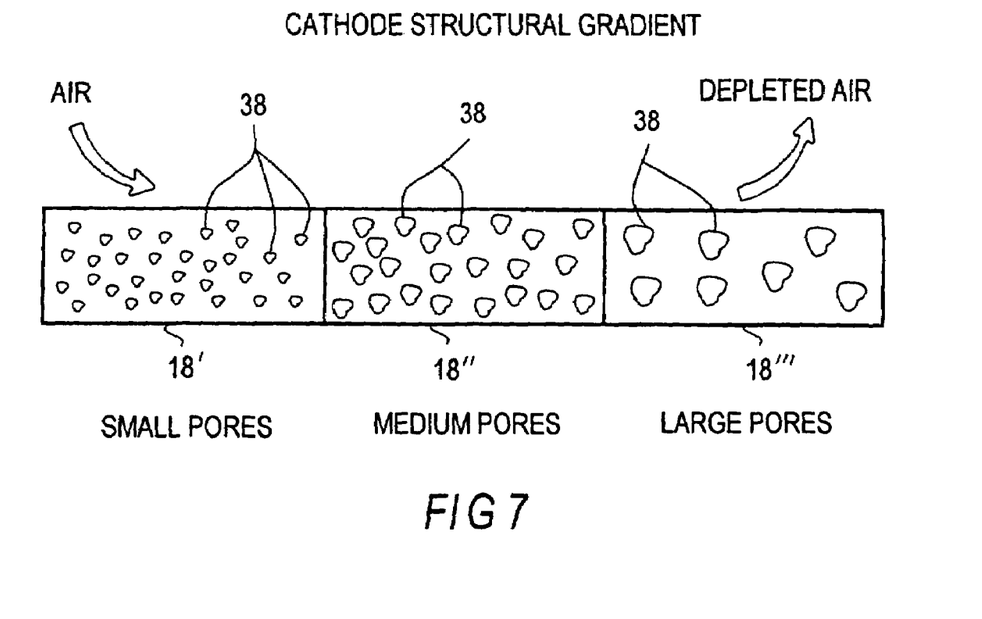
FIG. 7 is a block diagram of an embodiment of a cathode structural gradient.

Referring now to FIG. 7, an embodiment of a cathode 18 structural gradient according to the present invention is shown. The structure of discrete area 18''' includes pores 38; the structure of discrete area 18" includes pores 38, which are smaller than the pores 38 in discrete area 18'''; and the structure of discrete area 18' includes pores 38 smaller than the pores 38 in discrete area 18". It is believed that increasing the size of pores 38 downstream from inlet 20 advantageously allows higher diffusional mass transport to the active areas in the cathode 18 when there is a low(er) concentration of molecular oxygen in the air stream. It is to be understood that FIG. 7 is a very simplified representation. For example, the structural gradient may not simply be smaller to bigger pores 38, it may be cathode 18 with different pore size distribution(s), e.g. dual distribution which may be a combination of large, transport pores for faster diffusion and nanopores with a higher concentration of catalytic centers.

Figure 8A:
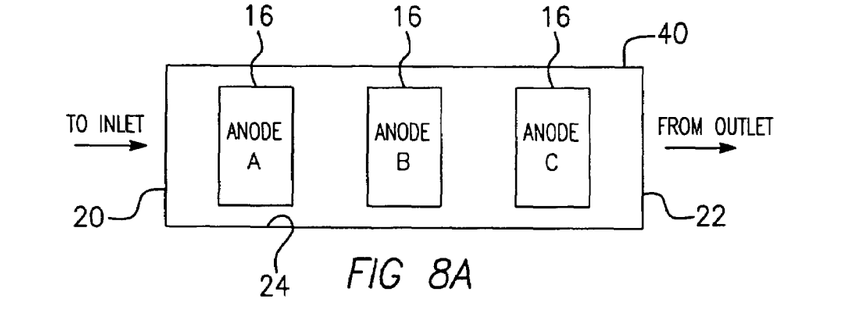
FIG. 8A is a block diagram of an embodiment of an anode portion of a fuel cell stack.
Figure 8B:
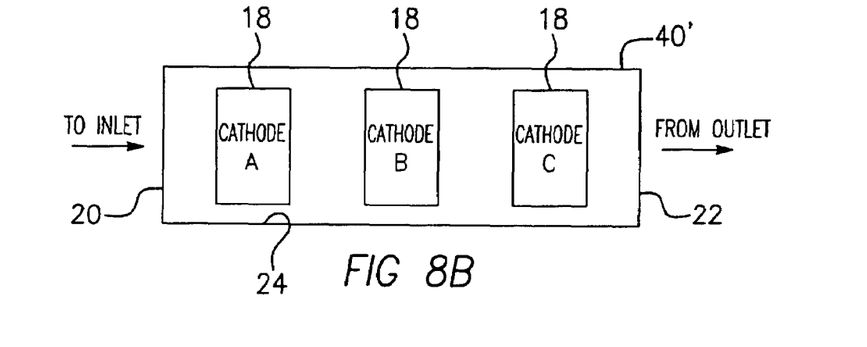
FIG. 8B is a block diagram of an embodiment of a cathode portion of a fuel cell stack.

According to embodiments of the present invention, the compositional and/or structural gradient for the electrodes may also be incorporated into fuel cells stacks. The composition and/or structure of a specific anode 16/cathode 18 in the stack may be predetermined relative to its position along the gas flow path. Referring now to FIGS. 8A and 8B, embodiments of fuel cell stacks 40, 40' are shown in schematic block diagrams. It is to be understood that when anode(s) 16 is shown (as in FIG. 8A), it is (although not shown) associated with an adjacent electrolyte 14 and cathode 18 to form a fuel cell assembly 12. Likewise, when cathode(s) 18 is shown (as in FIG. 8B), it is to be understood that it is associated with an adjacent electrolyte 14 and anode 16 to form a fuel cell assembly 12.

Fuel cell stack 40, 40' includes an inlet 20, an outlet 22, and a flow passage 24 disposed between inlet 20 and outlet 22 and having a gas stream flowing therethrough. A plurality of electrodes 16, 18 is operatively positioned within the flow passage 24 from proximate inlet 20 to proximate outlet 22 and positions therebetween. According to an embodiment of the present invention, the structure and/or the composition of each of the plurality of electrodes 16, 18 is predetermined based upon an expected composition of the gas stream at an area of the fuel cell stack 40, 40' in which the electrode is positioned.

In FIG. 8A, each of the plurality of electrodes is an anode 16; and in FIG. 8B, each of the plurality of electrodes is a cathode 18. Although three anodes/cathodes A, B, C are shown, it is to be understood that fuel cell stacks 40, 40' may include any number of individual anodes 16/cathodes 18 as desired and/or necessitated by a particular end use. As non-limiting examples, anode/cathode A, anode/cathode B and anode/cathode C are as follows.

According to an embodiment of the present invention, the composition and/or the structure of anode A is optimized for substantially unreformed hydrocarbon fuel. According to an embodiment of the present invention, the composition and/or the structure of cathode A is optimized for a gas stream substantially undepleted of oxidants.

According to an embodiment of the present invention, the composition and/or the structure of anode C is optimized for at least one of substantially reformed or partially reformed hydrocarbon fuel, byproducts thereof, and mixtures thereof. According to an embodiment of the present invention, the composition and/or structure of cathode C is optimized for a gas stream substantially depleted of oxidants.

According to an embodiment of the present invention, the composition and/or structure of anode B is optimized for at least one of substantially unreformed or partially reformed hydrocarbon fuel, byproducts thereof, and mixtures thereof. According to an embodiment of the present invention, the composition and/or structure of cathode B is optimized for a gas stream partially depleted of oxidants.

It is to be understood that the compositions and/or structures of anode/cathode A, B, C may be chosen from any examples given above. As a non-limitative example, the composition of anode A may have as a main component thereof $LaCr(Ni)O_3$, which is an example given above for discrete area 16'. The composition of cathode A may be SSCO with an amount of iron (which is an example given above for discrete area 18') larger than an amount of iron in cathode B. Similarly, any of the examples, and/or combinations thereof, of compositions and/or structures given for discrete areas 16'/18', 16"/18" and 16''', 18''' may be used for anode/cathode A, anode/cathode B and anode/cathode C, respectively.

Further, it is to be understood that in addition to the composition and/or structure of each anode/cathode A, B, C being individually uniform (as described immediately hereinabove), any, some or all of the individual anodes/cathodes A, B, C may have compositional and/or structural gradients thereon (e.g. anode A may include any, all or further discrete areas 16', 16" and 16''').

Figure 9:
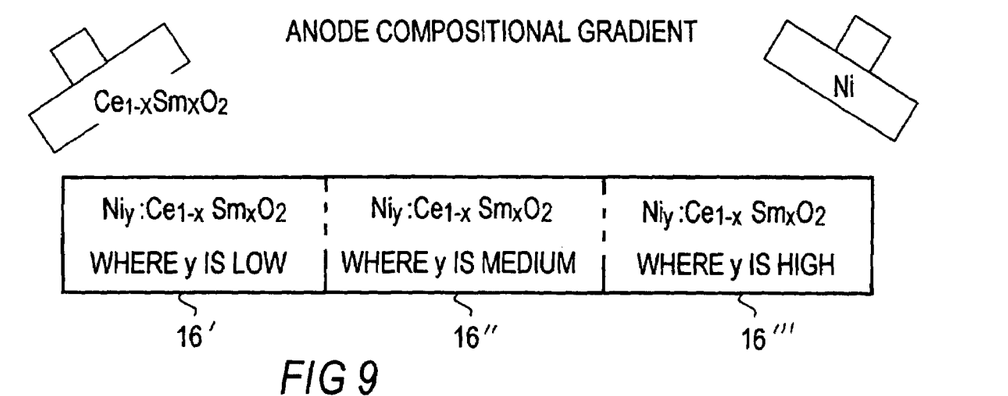
FIG. 9 is a schematic representation of an embodiment of a method for making an anode having compositional gradient(s).

Referring now to FIG. 9, one method of growing anode materials with compositional gradients is shown. An embodiment of a method for making a fuel cell anode 16 includes the step of depositing a first film on a first end region 16' of a substrate, wherein the first film is preferentially catalytically active toward substantially unreformed hydrocarbon fuel. The method may further include the step of depositing a second film on a second end region 16''' of the substrate opposed to the first end region 16', wherein the second film is preferentially catalytically active toward at least one of substantially reformed or partially reformed hydrocarbon fuel, byproducts thereof, and mixtures thereof.

The method may further optionally include the step of depositing an intermediate film on a region 16" of the substrate intermediate the first end region 16' and the second end region 16''', wherein the intermediate film is preferentially catalytically active toward at least one of substantially unreformed or partially reformed hydrocarbon fuel, byproducts thereof, and mixtures thereof.

It is to be understood that the dashed lines between discrete areas 16', 16" and 16''' in FIG. 9 represent that this embodiment of the method of the present invention generally results in a gradient distribution of the deposited materials, i.e. a continuous, inhomogeneous distribution. It is to be further understood that, in any of the embodiments discussed herein, discrete areas 16', 16", 16''', 18', 18", 18''' may also have a gradient distribution between adjacent areas, i.e. a continuous, inhomogeneous distribution.

In an embodiment of the method of the present invention, each of the first, intermediate, and second films has as a main component thereof a nickel-samaria doped ceria cermet, and the method further includes the step of biasing inclusion of nickel toward the second film.

In an alternate embodiment of the method of the present invention, the first film has as a main component thereof $LaCr(Ni)O_3$, the intermediate film has as a main component thereof $La(Sr)CrO_3$, and the second film has as a main component thereof $La(Sr)Cr(Mn)O_3$.

An embodiment of a method of the present invention for making a fuel cell cathode 18 includes the step of depositing a first film on a first end region 18' of a substrate, wherein the first film is preferentially catalytically active toward a gas stream substantially undepleted of oxidants. The method may further include the step of depositing a second film on a second end region 18''' of the substrate opposed to the first end region 18', wherein the second film is preferentially catalytically active toward a gas stream substantially depleted of oxidants.

The method may further optionally include the step of depositing an intermediate film on a region 18" of the substrate intermediate the first end region 18' and the second end region 18''', wherein the intermediate film is preferentially catalytically active toward a gas stream partially depleted of oxidants.

In an embodiment of the method of the present invention, each of the intermediate and second films has therein an amount of a material catalytically more active (than a main/base cathode 18 material/substrate) for the electrochemical reduction of molecular oxygen (some suitable, non-limitative examples of the more catalytically active material are as described hereinabove). The method further includes the step of biasing inclusion of the more catalytically active material (e.g. platinum) toward the second film.

In an embodiment of the method of the present invention, each of the first and intermediate films has therein an amount of a material catalytically less active than a main/base cathode 18 material/substrate (some suitable, non-limitative examples of the less catalytically active material are as described hereinabove). The method further includes the step of biasing inclusion of the less catalytically active material (e.g. iron) toward the first film.

Without being bound to any theory, it is believed that embodiments of the method of the present invention may result in changes in morphology/structure, as well as in composition. Angular deposition may result in porous materials depending on many factors, two of which factors are adatom mobility (material and temperature dependent, also dependent on other parameters which may affect the energy of the adatom when it reaches the surface of the substrate: process pressure, power, substrate bias, target-to-substrate distance, and the like), and self-shadowing due to nucleation and growth of islands (due to the low deposition angles).

As such, it is to be understood that the first, intermediate and second anode films may also include pores 36 (such as pores 36 in discrete areas 16', 16" and 16''', respectively, as shown in FIG. 5), and/or other changes in morphology. It is to be further understood that the first, intermediate and second cathode films may also include pores 38 (such as pores 38 in discrete areas 18', 18" and 18''', respectively, as shown in FIG. 7), and/or other changes in morphology.

Further, it is to be understood that several different methods may be used to make the compositional gradients of embodiments of the present invention, including but not limited to sputter deposition, impregnation, dip coating or other means, and the like. Further methods include, but are not limited to asymmetric screen printing and/or asymmetric tape casting, both generally with dopant or pore former delivery from one side, colloidal spray deposition, and the like. Substantially all deposition methods are contemplated as being within the purview of the present invention, provided that there is some asymmetry (i.e., two sources or more with different compositions wherein the sources will not provide a homogenous distribution on the substrate, e.g. one source biased to one end and the other source biased to the other end).

It is to be understood that the electrolyte 14 may be formed from any suitable material. In an embodiment of the present invention, electrolyte 14 is at least one of oxygen ion conducting membranes, proton conductors, carbonate ($CO_3^{2-}$) conductors, $OH^-$ conductors, and mixtures thereof.

In an alternate embodiment, electrolyte 14 is at least one of cubic fluorite structures, doped cubic fluorites, proton-exchange polymers, proton-exchange ceramics, and mixtures thereof. In a further alternate embodiment, electrolyte 14 is at least one of yttria-stabilized zirconia, samarium doped-ceria, gadolinium doped-ceria, $La_aSr_bGa_cMg_dO_{3-\delta}$, and mixtures thereof.

It is to be understood that the anode 16 and cathode 18 may be formed from any suitable material, as desired and/or necessitated by a particular end use. In an embodiment, each of the anode 16 and cathode 18 is at least one of metals, ceramics and cermets.

In an embodiment of the present invention, some non-limitative examples of metals which may be suitable for the anode 16 include at least one of nickel, platinum, palladium, and mixtures thereof. Some non-limitative examples of ceramics which may be suitable for the anode 16 include at least one of $Ce_xSm_yO_{2-\delta}$, $Ce_xGd_yO_{2-\delta}$, $La_xSr_yCr_zO_{3-\delta}$, and mixtures thereof. Some non-limitative examples of cermets which may be suitable for the anode 16 include at least one of Ni—YSZ, Cu—YSZ, Ni—SDC, Ni-GDC, Cu—SDC, Cu-GDC, and mixtures thereof.

In an embodiment of the present invention, some non-limitative examples of metals which may be suitable for the cathode 18 include at least one of silver, platinum, ruthenium, rhodium, and mixtures thereof. Some non-limitative examples of ceramics which may be suitable for the cathode 18 include at least one of $Sm_xSr_yCoO_{3-\delta}$, $Ba_xLa_yCoO_{3-\delta}$, $Gd_xSr_yCoO_{3-\delta}$, and mixtures thereof.

In any of the embodiments described herein, the gas to which fuel cell 10 is exposed includes reactants and/or oxidants and/or mixtures thereof. In an embodiment, the reactants are fuels, and the oxidants are one of oxygen, air, and mixtures thereof.

It is to be understood that any suitable fuel/reactant may be used with the fuel cell 10 of the present invention. In an embodiment, the fuel/reactant is selected from at least one of hydrogen, methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant is selected from the group consisting of butane, propane, methane, pentane, and mixtures thereof. Suitable fuels may be chosen for their suitability for internal and/or direct reformation, suitable vapor pressure within the operating temperature range of interest, and like parameters.

It is to be understood that the "expected compositions" of gas described herein are non-limitative, and for illustrative purposes. As such, it is to be understood that the discrete areas 16'/18', 16"/18", 16'''/18''' and/or individual anodes/cathodes A, B, C should be optimized for whatever fuel is chosen, and its reaction and consequent byproducts along the fuel flow path.

In an embodiment of the present invention, the fuel cell 10 is a single chamber fuel cell (FIGS. 1, 1A and 1B). FIG. 2 is an example of an anode fuel/air mixture gradient for a single chamber fuel cell. In embodiments of single chamber fuel cells, the gas is a mixture of reactants and oxidants.

It is to be understood that it is not necessary for good performance of the fuel cell 10 to have leak tight separation between air, fuel and exhaust in embodiments of the present invention relating to single-chamber fuel cells. When mixing fuel, air and/or exhaust, it may be desirable to keep the dimensions in the fuel cell stack below the critical length required for propagation of a flame; e.g. for hydrocarbons, a flame generally needs to be at least about 1-3 mm in size to exist at room temperature. Optionally or additionally, it may be desirable to adjust the air-fuel mixture so as to run with excess (above the upper flammability limit) fuel (for example, the upper flammability limit for propane is 9.6%); and then to add more air when the oxygen is consumed later in the stack. It may be desirable to add air at several locations in the stack. Alternately to running with excess fuel, it may be desirable to adjust the air-fuel mixture so as to run with excess (below the lower flammability limit) air (for example, the lower flammability limit for propane is 2.2%); and then to add more fuel when the fuel is consumed later in the stack. It may be desirable to add fuel at several locations in the stack. It is believed apparent that a mixture of multiple flammable gases will have a different flammability limit than the flammability limit of the gases individually. Thus, if for example, carbon monoxide (as a reaction product) is combined with propane (as a fuel) later in the cell, the lower flammability limit of the mixture is 3.3%, while the upper limit is 10.9% according to Le Châtelier's Principle.

In an alternate embodiment of the present invention, the fuel cell 10 is a dual chamber fuel cell (FIG. 1C). In embodiments of dual chamber fuel cells, the gas is one of reactants and oxidants. Oxidants are carried to the cathode 18 of each of the fuel cell assemblies 12, and reactants are carried to the anode 16 of each of the fuel cell assemblies.

It is to be understood that the gas flow may be in any suitable direction as desired and/or necessitated by a particular end use. For example, the gas flow direction may be a direction reverse of that indicated by arrow A (FIG. 1), if desired. If such gas flow direction is reversed, it is to be further understood that inlet 20 and outlet 22 would also be the reverse of those shown in the figures, and discrete areas 16', 18' and 16''', 18''' would be the reverse of those shown in the figures.

It is to be understood that the anode 16 and/or cathode 18 are to be optimized according to an expected composition of the gas to which it 16, 18 is exposed. It is to be further understood that many embodiments of the anodes 16/cathodes 18 are contemplated as being within the purview of the present invention. For example, each of anode 16 and/or cathode 18 may include any of the appropriate structures and/or compositions for discrete areas 16'/18', 16"/18" and 16'''/18''' (as well as other appropriate structures/compositions), in any combination thereof. As one non-limitative example, discrete area 16''' of anode 16 may be formed from $Ni_y:Ce_{1-x}Sm_xO_2$, and also may include large pores 36 as shown in FIG. 5.

The gas phase and/or compositional and/or structural gradients of the anodes 16/cathodes 18 of embodiments of the present invention allow for better fuel utilization, better thermal stability of the fuel cell 10/stack 40, 40', and enhanced performance.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for making a fuel cell anode, comprising the steps of:
    depositing a first film on a first end region of a substrate, wherein the first film is preferentially catalytically active toward substantially unreformed hydrocarbon fuel;
    depositing a second film on a second end region of the substrate, the second end region opposed to the first end region, wherein the second film is preferentially catalytically active toward at least one of substantially reformed or partially reformed hydrocarbon fuel, byproducts thereof, and mixtures thereof;
    depositing an intermediate film on a region of the substrate intermediate the first end region and the second end region, wherein the intermediate film is preferentially catalytically active toward at least one of substantially unreformed or partially reformed hydrocarbon fuel, byproducts thereof, and mixtures thereof; and
    biasing inclusion of nickel toward the second film, wherein each of the first, intermediate, and second films has as a main component thereof a nickel-samaria doped ceria cermet.

2. A method for making a fuel cell anode, comprising the steps of:
    depositing a first film on a first end region of a substrate, wherein the first film is preferentially catalytically active toward substantially unreformed hydrocarbon fuel;
    depositing a second film on a second end region of the substrate, the second end region opposed to the first end region, wherein the second film is preferentially catalytically active toward at least one of substantially reformed or partially reformed hydrocarbon fuel, byproducts thereof, and mixtures thereof; and
    depositing an intermediate film on a region of the substrate intermediate the first end region and the second end region, wherein the intermediate film is preferentially catalytically active toward at least one of substantially unreformed or partially reformed hydrocarbon fuel, byproducts thereof, and mixtures thereof;
    wherein the first film has as a main component thereof $LaCr(Ni)O_3$, wherein the intermediate film has as a main component thereof $La(Sr)CrO_3$, and wherein the second film has as a main component thereof $La(Sr)Cr(Mn)O_3$.

3. The method as defined in claim 1 wherein the second film comprises pores, wherein the intermediate film comprises pores smaller than the second film pores, and wherein the first film comprises pores smaller than the intermediate film pores.

4. A fuel cell anode formed by the process of claim 1.

5. A method of using a fuel cell, comprising the step of:
    operatively connecting the fuel cell to at least one of an electrical load and an electrical storage device, the fuel cell comprising: a flow passage having a gas stream flowing therethrough; and at least one anode formed by the process of claim 1 operatively disposed in the flow passage.

6. The method as defined in claim 2 wherein the second film comprises pores, wherein the intermediate film comprises pores smaller than the second film pores, and wherein the first film comprises pores smaller than the intermediate film pores.

7. A fuel cell anode formed by the process of claim 2.

8. A method of using a fuel cell, comprising the step of: operatively connecting the fuel cell to at least one of an electrical load and an electrical storage device, the fuel cell comprising: a flow passage having a gas stream flowing therethrough; and at least one anode formed by the process of claim 2 operatively disposed in the flow passage.

9. The method as defined in claim 1 wherein biasing inclusion of the nickel toward the second film includes adjusting an amount of nickel that is deposited in each of the films such that the amount of the nickel in the intermediate film is greater than the amount of the nickel in the first film, and the amount of the nickel in the second film is greater than the amount of the nickel in the intermediate film.

* * * * *